United States Patent [19]

Olander, Jr. et al.

[11] 4,145,752
[45] Mar. 20, 1979

[54] PROGRAMMABLE CALCULATOR INCLUDING SEPARATE LINE NUMBERING MEANS FOR USER-DEFINABLE FUNCTIONS

[75] Inventors: Emil E. Olander, Jr., Fort Collins; Rex J. James, Loveland; Ivar W. Larson, Loveland; Wayne F. Covington, Loveland; Jack M. Walden, Loveland; Robert E. Watson, Loveland; Francis J. Yockey, Loveland; Fred Wenninger, Jr., Loveland; Homer C. Russell, Berthoud, all of Colo.

[73] Assignee: Hewlett-Packard Company, Palo Alto, Calif.

[21] Appl. No.: 802,296

[22] Filed: Jun. 1, 1977

Related U.S. Application Data

[62] Division of Ser. No. 510,921, Sep. 30, 1974, Pat. No. 4,028,538, which is a division of Ser. No. 212,581, Dec. 27, 1971, Pat. No. 3,839,630.

[51] Int. Cl.² ............................................. G06F 15/06
[52] U.S. Cl. ................................... 364/709; 364/200
[58] Field of Search ................ 235/152, 156; 364/200, 364/709, 706

[56] References Cited

U.S. PATENT DOCUMENTS 3,760,171  9/1973  Wang ..................... 235/156
3,859,635  1/1975  Watson et al. .............. 340/172.5

*Primary Examiner*—David H. Malzahn
*Attorney, Agent, or Firm*—William E. Hein

[57] ABSTRACT

An adaptable programmable calculator is provided by employing a modular read-write and read-only memory unit capable of being expanded to provide the calculator with additional program and data storage functions oriented towards the environment of the user, a central processing unit capable of performing both serial binary and parallel binary-coded-decimal arithmetic, and an input-output control unit capable of bidirectionally transferring information between the memory or central processing units and a number of input and output units, such as a keyboard and an output display unit. The memory, central processor, and input-output control units are controlled by a microprocessor included in the central processing unit. Functions and subroutines that are defined by the user, stored in the calculator memory, and associated with definable keys of the keyboard are each automatically assigned a sequence of line numbers that is independent of the sequence of line numbers assigned to any other function, subroutine, or mainline program stored in the calculator memory. Such defined functions and subroutines defined by the user and stored in the calculator memory may be selectively erased from memory without thereby altering a mainline program or other functions or subroutines stored therein.

3 Claims, 10 Drawing Figures

PROGRAMMABLE CALCULATOR INCLUDING SEPARATE LINE NUMBERING MEANS FOR USER-DEFINABLE FUNCTIONS

CROSS REFERENCE to RELATED APPLICATION

This is a division of application Ser.. No. 510,921, filed on Sept. 30, 1974, now U.S. Pat. No. 4,028,538, which is in turn a division of application Ser. No. 212,581, filed on Dec. 27, 1971, now issued as U.S. Pat. No. 3,839,630. The subject matter of U.S. Pat. No. 3,839,630 is incorporated herein by reference.

BACKGROUND OF THE INVENTION

This invention relates generally to calculators and improvements therein and more particularly to programmable calculators that may be controlled both manually from the keyboard input unit and automatically by a stored program loaded into the calculator from the keyboard input unit or an external record member.

Computational problems may be solved manually, with the aid of a calculator (a dedicated computational keyboard-driven machine that may be either programable or nonprogrammable), or a general purpose computer. Manual solution of computational problems is often very slow, so slow in many cases as to be an impractical, expensive, and ineffective use of the human resource, particularly when there are other alternatives for solution of the computational problems.

Nonprogrammable calculators may be employed to solve many relatively simple computational problems more efficiently than they could be solved by manual methods. However, the keyboard operations or language employed by these calculators is typically trivial in structure, thereby requiring many keyboard operations to solve more general arithmetic problems. Programmable calculators may be employed to solve many additional computational problems at rates hundreds of times faster than manual methods. However, the keyboard language employed by these calculators is also typically relatively simple in structure, thereby again requiring many keyboard operations to solve more general arithmetic problems.

Another basic problem with nearly all of the keyboard languages employed by conventional programmable and nonprogrammable calculators is that they allow the characteristics of the hardware of the calculator to show through to the user. Thus, the user must generally work with data movement at the hardware level, for example, by making sure that data is in certain storage registers before specifying the operations to be performed with that data and by performing other such "housekeeping" functions.

SUMMARY OF THE INVENTION

The principal object of this invention is to provide an improved programmable calculator that has more capability and flexibility than conventional programmable calculators, that is smaller, less expensive and more efficient in calculating elementary mathmematical functions than conventional computer systems, and that is easier to utilize than conventional programmable calculators or computer systems.

Another object of this invention is to provide a programmable calculator employing a directly usable high-level keyboard language that completely eliminates most of the operator "housekeeping" requirements typically associated with the languages of conventional programmable calculators and computers.

Another object of this invention is to provide a programmable calculator in which the user may define and store within the calculator additional keyboard functions to be performed by the calculator, may associate each such defined keyboard function with a separate definable key of a keyboard input unit, and may cause each such defined keyboard function to be executed and/or stored as part of a program, either by itself or as part of an arithmetic expression, by depressing an execute key or a store key, respectively of the keyboard input unit following depression of the associated definable key and one or more other keys required to enter the parameters of the defined keyboard function into the calculator.

Another object of this invention is to provide a programmable calculator in which each subruoutine defined, stored within the calculator, and associated with a separate definable key of a keyboard input unit by the user is given a sequence of line numbers independent of the line numbers of any other function, subroutine, or program that may also be stored within the calculator.

These objects are accomplished according to the illustrated preferred embodiment of this invention by employing a keyboard input unit, a magnetic card reading and recording unit, a solid state output display unit, an output printer unit, an input-output control unit, a memory unit, and a central processing unit to provide an adaptable programmable calculator having manual operating, automatic operating, program entering, magnetic card reading, magnetic card recording, and alphameric printing modes. The keyboard input unit includes a group of data keys for entering numeric data into the calculator, a group of control keys for controlling the various modes and operations of the calculator and the format of the output display, and a group of definable keys for controlling additional functions that may be added by the user. All of the data keys and nearly all of the control keys may also be employed for programming the calculator, many of the control keys being provided solely for this purpose.

The magnetic card reading and recording unit includes a reading and recording head, a drive mechanism for driving a magnetic card from an input receptacle in the front panel of the calculator housing past the reading and recording head to an output receptacle in the front panel, and reading and recording drive circuits coupled to the reading and recording head for bidirectionally transferring information between the magnetic card and the calculator as determined by the control keys of the keyboard input unit. It also includes a pair of detectors and an associated control circuit for disabling the recording drive circuit whenever a notch is detected in the leading edge of the magnetic card to prevent information recorded on the magnetic card from being inadvertently destroyed. Such a notch may be provided in any magnetic card the user desires to protect by simply pushing out a perforated portion thereof.

The input printer unit includes a stationary thermal printing head with a row of resistive heating elements, a drive circuit for selectively energizing each heating element, and a stepping mechanism for driving a strip of thermally-sensitive recording paper past the stationary thermal printing head in seven steps for each line of alphameric information to be printed out. Every alphabetic and numeric character and many other symbols may be printed out individually or in messages as determined by the control keys of the keyboard input unit or by a program stored within the calculator.

The input-output control unit includes a sixteen-bit universal shift register serving as an input-output register into which information may be transferred serially from the central processing unit or in parallel from the keyboard input and magnetic card reading and recording units and from which information may be transferred serially to the central processing unit or in parallel to the solid state output display, magnetic card reading and recording, and output printer units. It also includes control logic responsive to the central processing unit for controlling the transfer of information between these units. The input-output control unit may also be employed to perform the same functions between the central processing unit and peripheral units including, for example, a digitizer, a marked card reader, an X-Y plotter, a magnetic tape unit, a disc, and a typewriter. A plurality of peripheral units may be connected at the same time to the input-output control unit by simply plugging interface modules associated with the selected peripheral units into receptacles provided therefore in a rear panel of the calculator housing.

The memory unit includes a modular random-access read-write memory having a dedicated system area and a separate user area for storing program steps and/or data. The user portion of the read-write memory may be expanded without increasing the overall dimensions of the calculator by the addition of a program storage module. Additional read-write memory made available to the user is automatically accommodated by the calculator, and the user is automatically informed when the storage capacity of the read-write memory has been exceeded.

The memory unit also includes a modular read-only memory in which routines and subroutines of basic instructions for performing the various functions of the calculator are stored. These routines and subroutines of the readonly memory may be expanded and adapted by the user to perform additional functions oriented toward the specific needs of the user. This is accomplished by simply plugging additional read-only memory modules into receptacles provided therefor in the top panel of the calculator housing. Added read-only memory modules are automatically accommodated by the calculator and may be associated with the definable keys of the keyboard input unit or employed to expand the operations associated with other keys. An overlay is employed with each added read-only memory module associated with the definable keys of the keyboard input unit to identify the additional functions that may then be performed by the calculator.

Plug-in read-only memory modules include, for example, a trigonometric module, a peripheral control module, and a definable functions module. The trigonometric module enables the calculator to perform trigonometric functions, logarithmic functions, and many other mathematical functions. The definable functions module enables the user to store subprograms of his own choosing in the program storage section of the read-write memory, associate them with some of the definable keys of the keyboard input unit, and protect them from subsequently being inadvertently altered or destroyed. These subprograms may have their own line numbering dequence and may be any of three types: an immediate execute type wherein the subprogram may be run upon depressing a DEFINE key; a subroutine utilizing parameters; a function having parameters that may be employed as any other keyboard function.

The memory unit further includes a pair of recirculating sixteen-bit serial shift registers. One of these registers serves as a memory address register for serially receiving information from an arithmetic-logic unit included in the central processing unit, for parallel addressing any memory location designated by the received information, and for serially transferring the received information back to the arithmetic-logic unit. The other of these registers serves as a memory access register for serially receiving information from the arithmetic-logic unit, for writing information in parallel into any addressed memory location, for reading information in parallel from any addressed memory location, and for serially transferring information to the arithmetic logic unit. It also serves as a four-bit parallel shift register for transferring four bits of binary-coded-decimal information in parallel to the arithmetic-logic unit.

The central processing unit includes four recirculating sixteen-bit serial shift registers, a four-bit serial shift register, the arithmetic logic unit, a programmable clock, and a microprocessor. Two of these sixteen-bit serial shift registers serve as accumulator registers for serially receiving information from and seriously transferring information to the arithmetic logic unit. The accumulator register employed is designated by a control flip-flop. One of the accumulator registers also serves as a four-bit parallel shift register for receiving four bits of binary-coded-decimal information in parallel from and transferring four bits of such information in parallel to the arithmetic logic unit. The two remaining sixteen-bit serial shift registers serve as a program counter register and a qualifier register, respectively. They are also employed for serially receiving information from and serially transferring information to the arithmetic-logic unit. The four-bit serial shift register serves as an extend register for serially receiving information from either the memory access register or the arithmetic-logic unit and for serially transferring information to the arithmetic-logic unit.

The arithmetic-logic unit is employed for performing one-bit serial binary arithmetic, four-bit parallel binary-coded-decimal arithmetic, and logic operations. It may also be controlled by the microprocessor to perform bidirectional direct and indirect arithmetic between any of a plurality of the working registers and any of the storage registers of the data storage section of the read-write memory.

The programmable clock is employed to supply a variable number of shift clock pulses to the arithmetic logic unit and to the serial shift registers of the input-output, memory, and central processing units. It is also employed to supply clock control signals to the input-output control logic and to the microprocessor.

The microprocessor includes a read-only memory in which a plurality of microinstructions and codes are stored. These microinstructions and codes are employed to perform the basic instructions of the calculator. They include a plurality of coded and non-coded microinstructions for transferring control to the input-output control logic, for controlling the addressing and accessing of the memory unit, and for controlling the operation of the two accumulator registers, the program counter register, the extend register and the arithmetic logic unit. They also include a plurality of clock codes for controlling the operation of the programmable clock, a plurality of qualifier selection codes for selecting qualifiers and serving as primary address codes for addressing the read-only memory of the microprocessor, and a plurality of secondary address codes for addressing the read-only memory of the microprocessor. In response to a control signal from a power supply provided for the calculator, control signals for the programmable clock, and qualifier control signals from the central processing and input-output control units, the microprocessor issues the microinstructions and codes stored in the read-only memory of the microprocessor as required to process either binary or binary-coded-decimal information entered into or stored in the calculator.

In the keyboard mode, the calculator is controlled by keycodes sequentially entered into the calculator from the keyboard input unit by the user. The solid state output display unit displays either the mnemonic representation of the keys as they are depressed or a numeric representation of output data or alphameric user instructions or program results. The output printer unit may be controlled by the user to selectively print out a numeric representation of any numeric data entered into the calculator from the keyboard input unit, a numeric representation of any result calculated by the calculator, or a program listing on a line-by-line basis of the mnemonic representation of the keys entered. The output printer unit may also be controlled by the user to print out labels for inputs to and outputs from the calculator and any other alphameric information that may be desired.

When the calculator is in the keyboard mode, it may also be operated in a trace alphameric printing mode. The output printer unit then prints out a mnemonic representation of each program line as it is entered by the user.

In the program running mode, the calculator is controlled by automatically obtaining compiled keycodes stored as steps of a program in the user storage section of the read-write memory. During automatic operation of the calculator, data may be obtained from the memory unit as designated by the program or may be entered from the keyboard input unit by the user while the operation of the calculator is stopped for data either by the program or by the user.

When the calculator is in the program running mode, the user may also employ a TRACE key to check the execution of the program line by line in order to determine whether the program, as entered into the calculator, does in fact carry out the desired sequence of operations.

In the program entering mode, keycodes are sequentially entered by the user into the calculator from the keyboard input unit and are compiled into Polish notation and stored as steps of a program in the user storage section of the read-write memory.

In the magnetic card reading mode, the magnetic card reading and recording unit may be employed by the user to separately load either data or programs into the calculator from one or more external magnetic cards.

In the magnetic card recording mode, the magnetic card reading and recording unit may be employed by the user to separately record either data or programs stored in the user section of the read-write memory onto one or more external magnetic cards. Programs may be coded by the user as being secure when they are recorded onto one or more external magnetic cards. The calculator detects such programs when they are reloaded into the calculator and prevents the user from re-recording them or obtaining any listing or other indication of the individual program steps.

DESCRIPTION OF THE DRAWINGS

The following figures have been numbered in correspondence with the same figures of U.S. Pat. No. 3,839,630, cited above as being incorporated herein by reference.

DESCRIPTION OF THE PREFERRED EMBODIMENT

GENERAL DESCRIPTION

Figure 1:
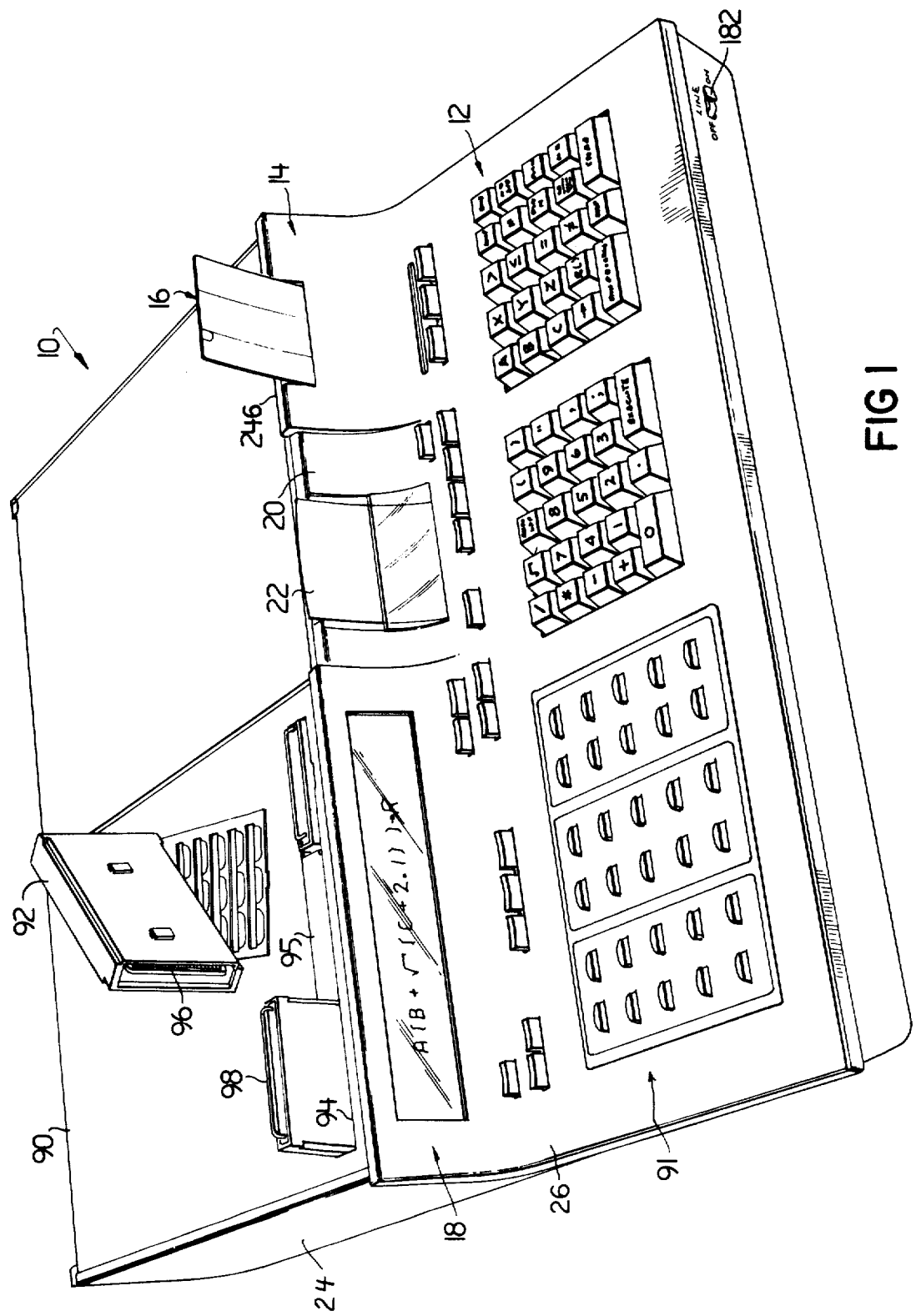
FIG. 1 is a front perspective view of an adaptable programmable calculator according to the preferred embodiment of this invention.

Referring to FIG. 1, there is shown an adaptable programmable calculator 10 including both a keyboard input unit 12 for entering information into and controlling the operation of the calculator and a magnetic card reading and recording unit 14 for recording information stored within the calculator onto one or more external magnetic cards 16 and for subsequently loading the information recorded on these and other similar magnetic cards back into the calculator. The calculator also includes a solid state output display unit 18 for displaying alphameric information stored within the calculator. It may also include an output printer unit 20 for printing out alphameric information on a strip of thermally-sensitive recording paper 22. All of these input and output units are mounted within a single calculator housing 24 adjacent to a curved front panel 26 thereof.

Figure 3A:
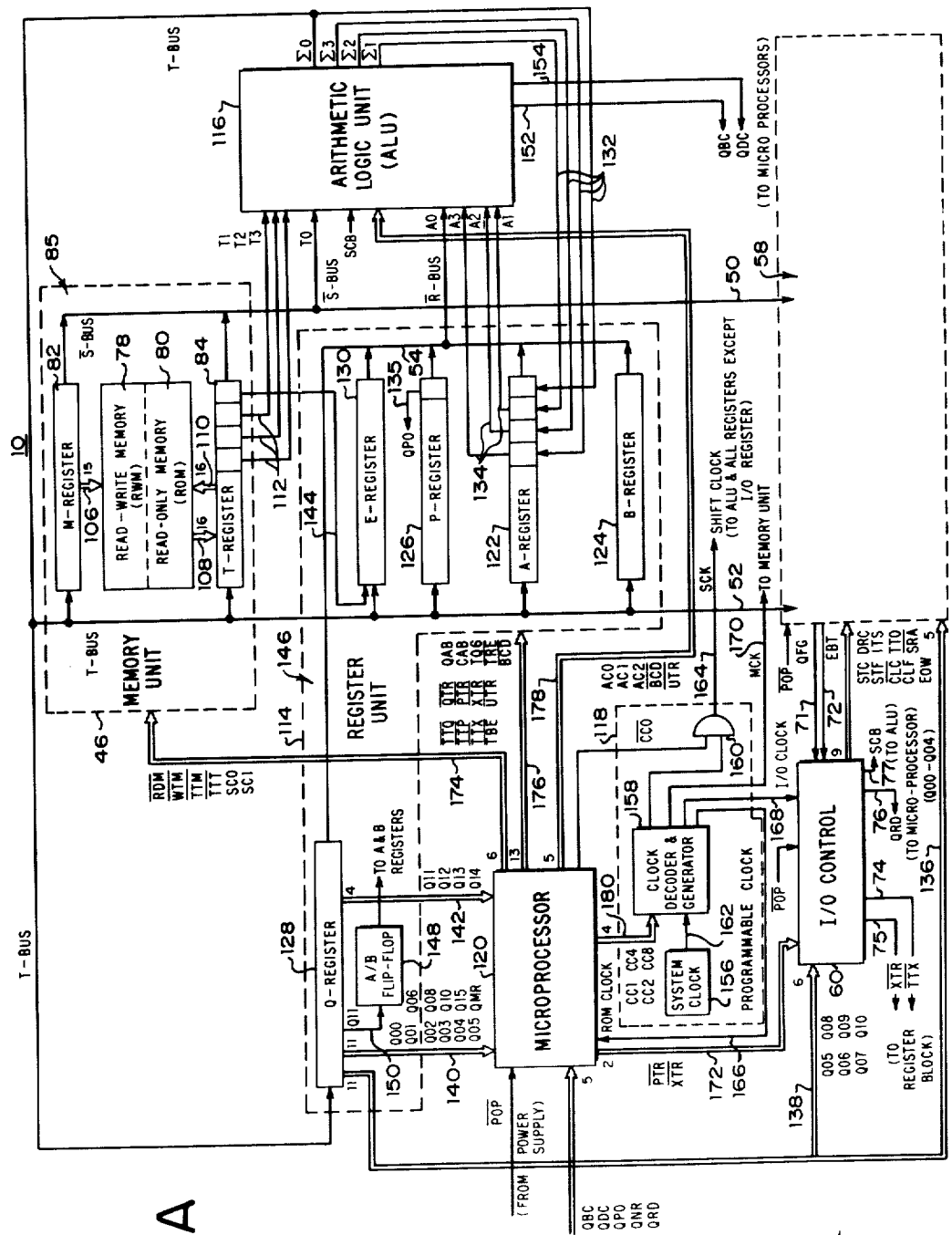
FIGS. 3A-B are a simplified block diagram of the adaptable programmable calculator of FIGS. 1 and 2.
Figure 3B:
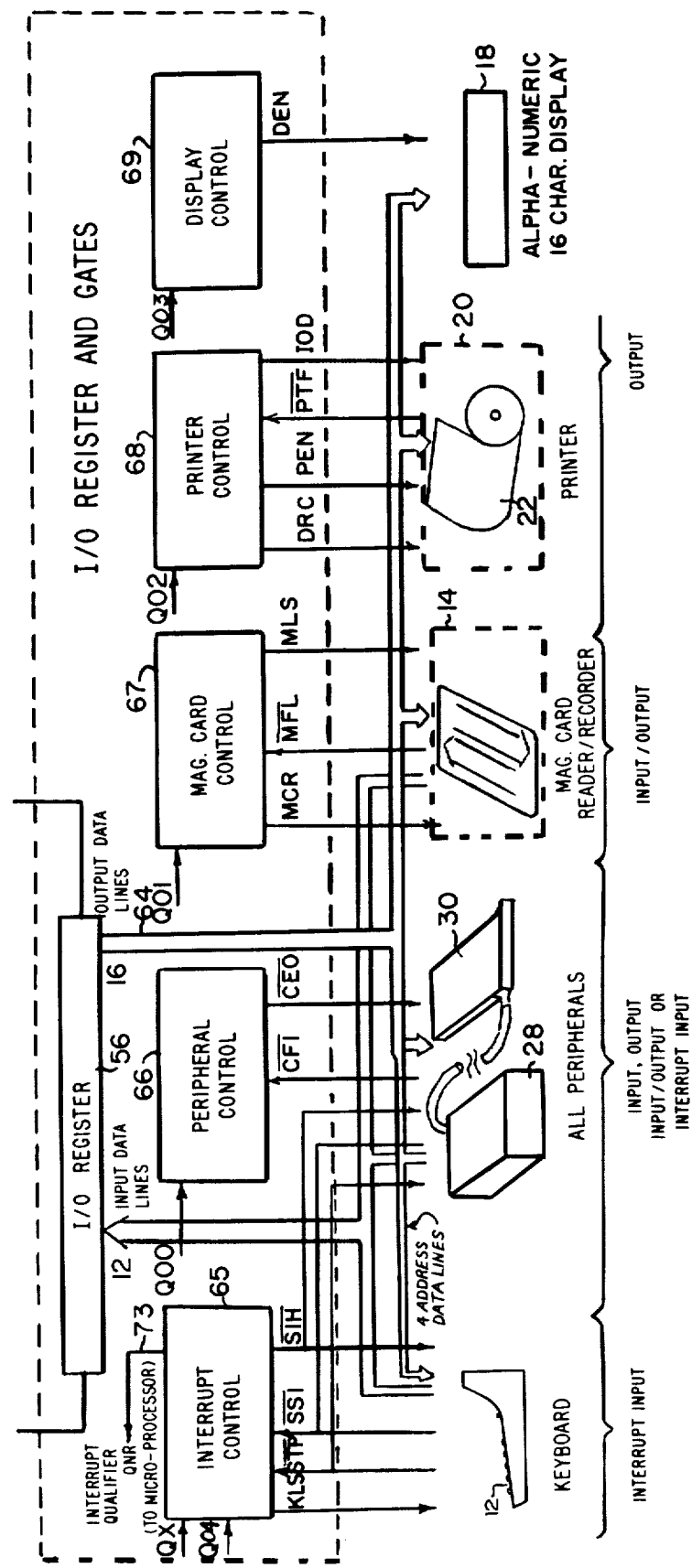
Figure 7:
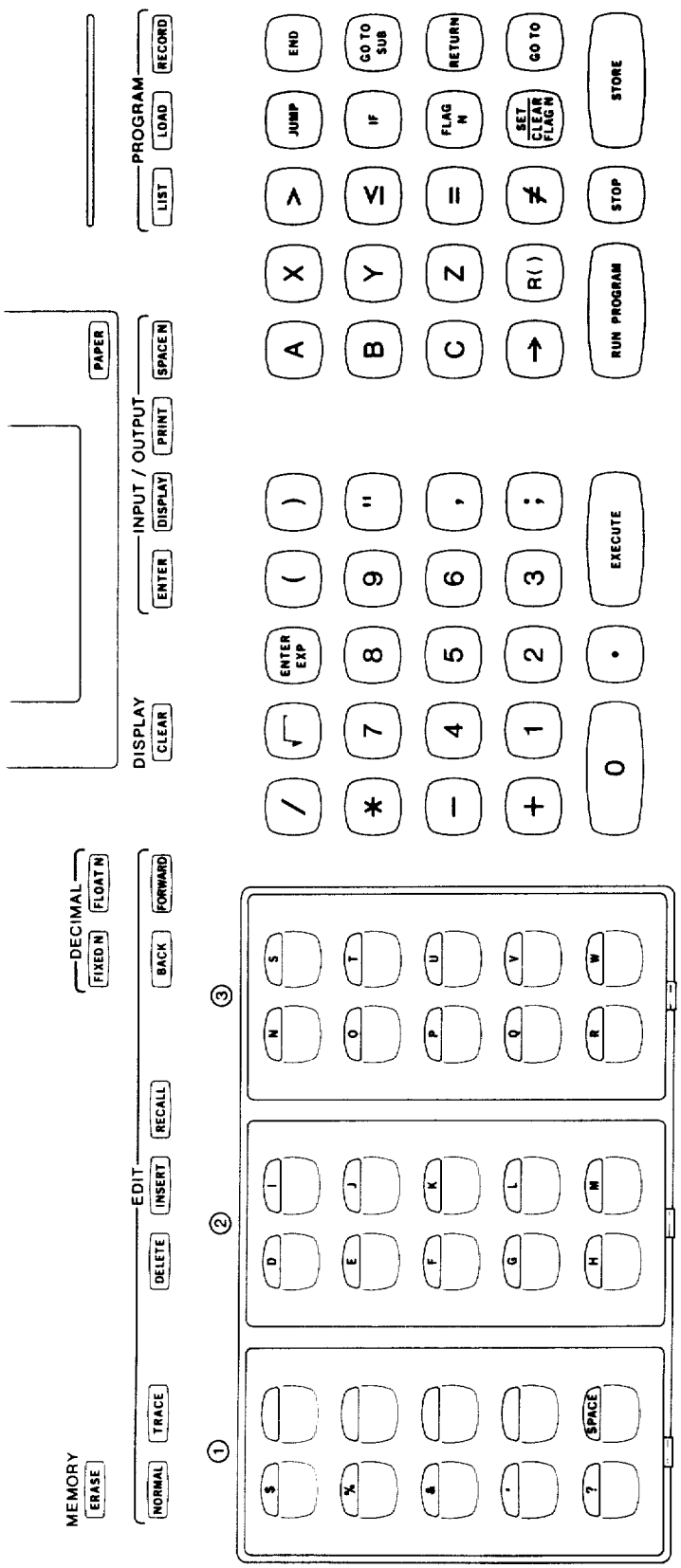
FIG. 7 is a plan view of the keyboard input unit employed in the adaptable programmable calculator of FIGS. 1 and 3A-B showing how the keyboard input unit may be redefined by an alpha plug-in read-only memory module that may also be employed in the adaptable programmable calculator.
Figures 10A, 10B:
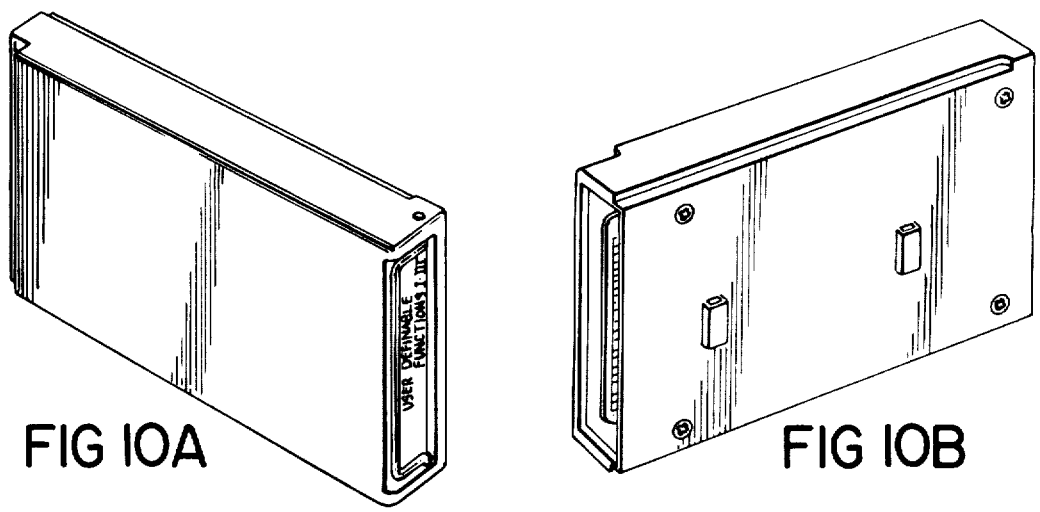
FIGS. 10A-E are perspective views of the user-definable functions plug-in read-only memory module that may be employed in the adaptable programmable calculator and plan views of the keyboard overlays associated therewith.
Figures 10C, 10D, 10E:
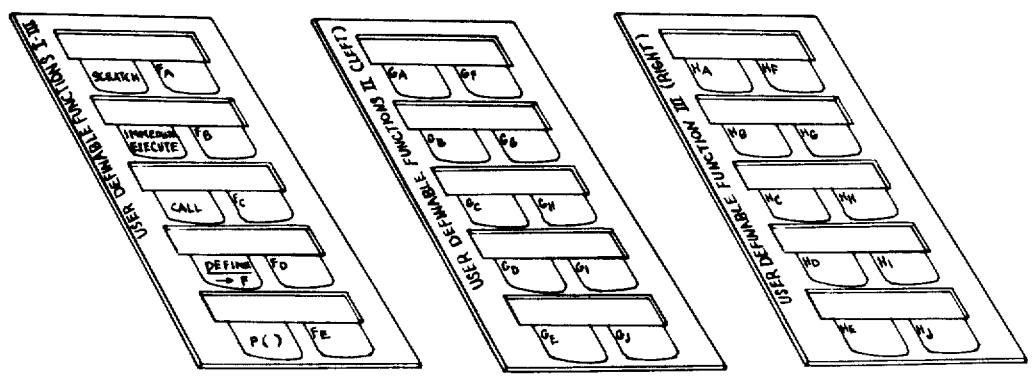

Referring to the simplified block diagram shown in FIGS. 3A-B, it may be seen that the calculator also includes an input-output control unit 44 (hereinafter referred to as the I/O control unit) for controlling the transfer of information to and from the input and output units, a memory unit 46 for storing and manipulating information entered into the calculator and for storing routines and subroutines of basic instructions performed by the calculator, and a central processing unit 48 (hereinafter referred to as the CPU) for controlling the execution of the routines and subroutines of basic instructions stored in the memory unit as required to process information entered into or stored within the calculator. The calculator also includes a bus system comprising an S̄-bus 50, a T-bus 52, and an R̄-bus 54 for transferring information from the memory and I/O control units to the CPU, from the CPU to the memory and I/O control units, and between different portions of the CPU. It further comprises a power supply for supplying DC power to the calculator and peripheral units employed therewith and for issuing a control signal $\overline{POP}$ when power is supplied to the calculator.

The I/O control unit 44 includes an input-output register 56 (hereinafter referred to as the I/O register), associated I/O gating control circuitry 58, and input-output control logic 60 (hereinafter referred to as the I/O control). I/O register 56 comprises a universal sixteen-bit shift register into which information may be transferred either bit-serially from CPU 48 via T-bus 52 or in parallel from keyboard input unit 12, magnetic card reading and recording unit 14, and peripheral input units 28 such as the marked card reader via twelve input party lines 62. Information may also be transferred from I/O register 56 either bit-serially to CPU 48 via $\bar{S}$-bus 50 or in parallel to magnetic card reading and recording unit 14, solid state output display unit 18, output printer unit 20, and peripheral output units 28 such as the X-Y plotter or the typewriter via sixteen output party lines 64.

I/O gating control circuitry 58 includes control circuits for controlling the transfer of information into and out of I/O register 56 in response to selected I/O qualifier control signals from CPU 48 and selected I/O control instructions from I/O control 60. It also includes an interrupt control circuit 65, a peripheral control circuit 66, a magnetic card control circuit 67, a printer control circuit 68, and a display control circuit 69 for variously controlling the input and output units and issuing control signals QFG and EBT to I/O control 60 via two output lines 71 and 72. These last mentioned control circuits variously perform their control functions in response to control signal $\overline{POP}$ from the power supply, I/O qualifier control signals from CPU 48, I/O control instructions from I/O control 60, and control signals from keyboard input unit 12. Interrupt control circuit 65 initiates the transfer of information into I/O register 56 from keyboard input unit 12 or interrupting peripheral input units 28 such as the marked card reader and issues a qualifier control signal QNR to CPU 48 via output lines 73. Peripheral control circuit 66 enables interface modules 30 plugged into the calculator to respond to information from I/O register 56, control associated peripheral units 28, transfer information to and/or receive information from associated peripheral units 28, and in some cases initiate the transfer of information to I/O register 56 from the interface modules themselves. Magnetic card control circuit 67 enables magnetic card reading and recording unit 14 to respond to information in I/O register 56 and either read information into I/O register 56 from a magnetic card 16 or record information onto a magnetic card 16 from I/O register 56. Printer control circuit 68 and display control circuit 69 enable output display unit 18, and output printer unit 20, respectively, to respond to information from I/O register 56.

When a basic I/O instruction obtained from memory unit 46 is to be executed, CPU 48 transfers control to I/O control 60 by issuing a pair of I/O microinstructions $\overline{PTR}$ and $\overline{XTR}$ thereto. In response to these I/O microinstructions from CPU 48, control signal $\overline{POP}$ from the power supply, control signals QFG and EBT from I/O gating control circuitry 58, and I/O qualifier and clock control signals from CPU 48, I/O control 60 selectively issues one or more I/O control instructions to gating control circuitry 58 as required to execute the basic I/O instruction designated by CPU 48 and issues control signals, $\overline{TTX}$, $\overline{XTR}$, QRD, and SCB to CPU 48 via output lines 74–77. The I/O qualifier control signals issued to I/O control 60 and gating control circuitry 58 by CPU 48 are derived from the basic I/O instruction to be executed. Those qualifier control signals issued to I/O control 60 designate the specific I/O control instructions to be issued by I/O control 60, while those issued to gating control circuitry 58 designate selected control circuits to be employed in executing the basic I/O instruction.

Memory unit 46 includes a modular random-access read-write memory 78 (hereinafter referred to as the RWM), a modular read-only memory 80 (hereinafter referred to as the ROM), a memory address register 82 (hereinafter referred to as the M-register), a memory access register 84 (hereinafter referred to as the T-register), and control circuitry 85 for these memories and registers. RWM 78 and ROM 80 comprise MOS-type semiconductor memories.

Routines and subroutines of basic instructions for performing the basic functions of the calculator and constants employed by these routines and subroutines are stored in these portions of ROM 80. An additional 3,072 sixteen-bit words of ROM may also be added on pages 4, 5, and 6 in steps of 512 and 1,024 words. This is accomplished by simply inserting plug-in ROM modules 92 into receptacles 94 provided therefore in top panel 90 of the calculator housing as illustrated in FIG. 1 by the partially-inserted plug-in ROM module on the left. As each plug-in ROM module 92 is inserted into one of these receptacles a spring-loaded door 95 at the entrance of the receptacle swings down allowing passage of the plug-in ROM modules. Once the plug-in ROM module is fully inserted as illustrated by the plug-in ROM module on the right, a printed circuit terminal board 96 contained within the plug-in ROM module plugs into a mating edge connector mounted inside the calculator. A handle 98 pivotally mounted at the top end of each plug-in ROM module 92 facilitates removal of the plug-in ROM module once it has been fully inserted into one of the receptacles 94.

Routines and subroutines of basic instructions (and any needed constants) for enabling the calculator to perform many additional functions are stored in each plug-in ROM module 92. The user himself may therefore quickly and simply adapt the calculator to perform many additional functions oriented toward his specific needs by simply plugging ROM modules of his own choosing into the calculator. Added plug-in ROM modules are automatically accommodated by the calculator by momentarily interrupting power or by depressing an ERASE MEMORY key, and they are associated with definable section 91 of keyboard input unit 12 or employed to expand the functions performed by this and other sections of the keyboard input unit.

Referring again to FIGS. 3A–B, M-register 82 of the memory unit comprises a recirculating sixteen-bit serial shift register into which information may be transferred bit-serially from CPU 48 via T-bus 52 and out of which information may be transferred bit-serially to CPU 48 via $\bar{S}$-bus 50. Information shifted into M-register 82 may be employed to address any word in RWM 78 or ROM 80 via fifteen output lines 106.

T-register 84 of the memory unit comprises a recirculating sixteen-bit serial shift register into which information may be transferred either bit-serially from CPU 48 via T-bus 52 or in parallel from any addressed word in RWM 78 and ROM 80 via sixteen parallel input lines 108. Information may be transferred from T-register 84 either bit-serially to CPU 48 via $\bar{S}$-bus 50 or in parallel to any addressed word in RWM 78 via sixteen parallel output lines 110. The four least significant bits of information contained in T-register 84 may comprise binary-coded-decimal information and may be transferred from the T-register in parallel to CPU 48 via three parallel output lines 112 taken with $\bar{S}$-bus 50.

The control circuitry 85 of the memory unit controls these transfers of information into and out of M-register 82 and T-register 84, controls the addressing and accessing of RWM 78 and ROM 80, and refreshes RWM 78. It performs these functions in response to memory microinstructions, memory clock pulses, and shift clock pulses from CPU 48.

CPU 48 includes a register unit 114, an arithmetic-logic unit 116 (hereinafter referred to as the ALU), a programmable clock 118, and a microprocessor 120. Register unit 114 comprises four recirculating sixteen-bit shift registers 122, 124, 126, and 128 and one four-bit shift register 130. Shift registers 122 and 124 serve as sixteen-bit serial accumulator registers (hereinafter referred to as the A-register and the B-register, respectively) into which information may be transferred bit-serially from ALU 116 via T-bus 52 and out of which information may be transferred bit-serially to ALU 116 via $\bar{R}$-bus 54. The four least significant bit positions of A-register 122 also serve as a four-bit parallel accumulator register into which four bits of binary-coded-decimal information may be transferred in parallel from ALU 116 via four parallel input lines 132 and out of which four bits of binary-coded-decimal information may also be transferred in parallel to ALU 116 via three parallel output lines 134 taken with $\bar{R}$-bus 54.

Shift register 126 serves as a sixteen-bit system program counter (hereinafter referred to as the P-register) into which information may be transferred bit-serially from ALU 116 via T-bus 52 and out of which information may be transferred bit-serially to ALU 116 via $\bar{R}$-bus 54. Information contained in the least significant bit position of P-register 126 may also be transferred as a qualifier control signal QPO to microprocessor 120 via output line 135.

Shift register 128 serves as a sixteen-bit qualifier register (hereinafter referred to as the Q-register) into which information may be transferred bit-serially from ALU 116 via T-bus 52 and out of which information may be transferred bit-serially to ALU 116 via $\bar{R}$-bus 54. Information contained in the five least significant bit positions of Q-register 128 is transferred to I/O gating control circuitry 58 as five one-bit I/O qualifier control signals Q00-Q04 via five parallel output lines 136, and information contained in the six next least significant bit positions of the Q-register is transferred to I/O control 60 as six one-bit I/O qualifier control signals Q05-Q10 via six parallel output lines 138. Similarly, information contained in the seven least significant, the ninth and eleventh least significant, and the most significant bit positions of Q-register 128 and information derived from the thirteenth, fourteenth, and fifteenth bit positions of the Q-register may be transferred to microprocessor 120 as eleven one-bit microprocessor qualifier control signals Q00-Q06, Q08, Q10, Q15, and QMR via eleven output lines 140. Information contained in the twelfth through the fifteenth least significant bit positions of Q-register 128 may be transferred to miroprocessor 120 as a four-bit primary address code via four parallel output lines 142.

Shift register 130 serves as a four-bit serial extend register (hereinafter referred to as the E-register) into which information may be transferred bit-serially either from ALU 116 via T-bus 52 or from the least significant bit position of T-register 84 via input line 144. Information may be also transferred out of E-register 130 to ALU 116 via R-bus 54.

Register unit 114 also includes control circuitry 146 for controlling the transfer of parallel binary-coded decimal information into and out of A-register 122 and the transfer of serial binary information into and out of A-register 122, B-register 124, P-register 126, Q-register 128, and E-register 130. This is accomplished in response to register microinstructions from microprocessor 120, control signals $\overline{TTX}$ and $\overline{XTR}$ from I/O control 60, and shift clock control pulses from programmable clock 118. Control circuitry 146 includes a flip-flop 148 (hereinafter referred to as the A/B flip-flop) for enabling the transfer of information into and out of either the A-register 122 or the B-register 124 as determined by the state of the A/B flip-flop 148 is initially determined by information Q11 transferred to the A/B flip-flop from the twelfth least significant bit position of Q-register 128 but may be subsequently complemented one or more times by microinstruction CAB from microprocessor 120.

ALU 116 may perform either one-bit serial binary arithmetic on data received from T-register 84 or M-register 82 via $\bar{S}$-bus 50 and/or from any register of register unit 114 via $\bar{R}$-bus 54 or four-bit parallel binary-coded-decimal arithmetic on data received from T-register 84 via output lines 112 taken with $\bar{S}$-bus 50 and/or from A-register 122 via output lines 134 taken with $\bar{R}$-bus 54. It may also perform logic operations on data received from memory unit 46 and/or register unit 114 via any of these lines. The arithmetic and logic operations performed are designated by ALU microinstructions from microprocessor 120 and are carried out in response to these microinstructions, shift clock control pulses from programmable clock 118, and control signal SCB from I/O control 60. Information is also transferred from ALU 116 to A-register 122 via output lines 132 or to I/O register 56, M-register 82, T-register 84, or any register of register unit 114 via T-bus 52 in response to microinstructions and control signals applied to these registers. If a carry results while ALU 116 is performing either one-bit serial binary arithmetic or four-bit parallel binary-coded-decimal arithmetic, the ALU issues a corresponding qualifier control signal QBC and QDC to microprocessor 120 via one of two output lines 152 and 154.

Programmable clock 118 includes a crystal-controlled system clock 156, a clock decoder and generator 158, and a control gate 160. System clock 156 issues regularly recurring clock pulses to clock decoder and generator 158 via output line 162. In response to these regularly recurring clock pulses from system clock 156 and to four-bit clock codes from microprocessor 120, clock decoder and generator 158 issues trains of n shift clock pulses to ALU 116, M-register 82, T-regiser 82, and all of the registers of register unit 114 via output line 164. These trains of n shift clock pulses are employed for shifting a corresponding number of bits of serial information into or out of any of these registers or for shifting a carry bit in the ALU. The number n of pulses in each of these trains may vary from one to sixteen as determined by the number of bits of serial information required during each operation to be performed. In response to a control signal $\overline{CCO}$ from microprocessor 120, control gate 160 prevents any shift clock pulses from being applied to the ALU or any of these registers. Upon completion of each train of n shift clock pulses, clock decoder and generator 158 issues a ROM clock pulse to microprocessor 120 via output line 166 and an I/O clock pulse to I/O control 60 via output line 168. In response to the regularly recurring clock signal from system clock 56, clock decoder and generator 158 also issues correspondingly regularly recurring memory clock pulses to memory unit 46 via output line 170.

Microprocessor 120 selectively issues two I/O microinstructions to I/O control 60 via two output lines 172, six memory microinstructions to memory unit 46 via six output lines 174, thirteen register microinstructions to register unit 114 via thirteen output lines 176, and five ALU microinstructions to ALU 116 via five output lines 178. It also issues a four-bit clock code associated with each of these microinstructions to clock decoder 158 via four output lines 180. These microinstructions and associated clock codes are issued as determined by the control signal POP from the power supply, the eleven microprocessor qualifier control signals from Q-register 128, the four-bit primary address codes from Q-register 128, and the five microprocessor qualifier control signals from I/O control 60, interrupt control 65, ALU 116, and P-register 126.

KEY OPERATIONS

All operations performed by the calculator may be controlled or initiated by the keyboard input unit and/or by keycodes entered into the calculator from the keyboard input unit, the magnetic card reading and recording unit, or peripheral input units such as the marked card reader and stored as program steps in the program storage section of the RWM. An operational description of the keyboard input unit is therefore now given with specific reference to FIG. 1, except as otherwise indicated.

TURN-ON PROCEDURE

When the OFF/ON switch located on the front of the calculator is set to the ON position, the following display appears:

$\phi$: END ⊢

The calculator is then ready for operation.

INITIALIZING THE CALCULATOR

The ERASE key has the same effect as switching the calculator off and then on again. It erases all stored data and programs from memory and clears the results of any previous calculation or operation.

THE FUNDAMENTAL USER OPERATION

Communication with the calculator is through the display. In general, there are two basic steps to follow when performing operations:

1. A set of directions is written into the display by actuating the appropriate keys.
2. The calculator is then instructed to follow these directions, and the result of any numerical operation is automatically displayed. When making keyboard calculations, this step consists soley of actuating the EXECUTE key.

These two basic steps form the fundamental user operation. With a few exceptions, all operations such as making calculations, loading or running programs, giving directions to the printer, etc., consist of some variation of the fundamental user operation.

DIAGNOSTIC NOTES

In addition to displaying numbers, directions, and the results of operations, the calculator also displays diagnostic notes to inform the user of operational errors or of special situations. The basic notes are numbered from 01 to 16 (higher numbered notes are associated with the various plug-in ROM's). The note number indicates the type of error or situation. For example, NOTE 01 indicates that the calculator was given a direction which it could not understand; NOTE 16 indicates that the printer paper supply has been exhausted. A list of the basic notes and a brief description of their meanings is given in the appendix at the end of Key Operations.

When a note condition occurs in a program execution is halted. The display then indicates the note as well as the number of the program line in which the note condition occurred; e.g., NOTE $\phi 2$ IN 4 indicates that a note 02 condition occurred during line 4.

KEYING DIRECTIONS AND NUMBERS

Directions are written into the display by actuating the appropriate keys. Suppose, for example, that the user desires to add 2 to 4 and print out the result. The keys PRINT 2 + 4 are actuated. The calculator does not, however, follow these directions until it is instructed to do so by actuating EXECUTE. It then prints (and displays) and result, 6. Numbers are keyed into the display, as on any standard office-machine, by actuating the number keys (o through 9) and the decimal point key in the required order. If a number is negative the minus sign should be keyed first before the number is keyed. Use of commas (such as in 32,351.6) is not allowed. As is the case with a direction. even though the keyed number is dispayed, it will not be executed by the calculator until the EXECUTE key is actuated. It is not normally desirable to execute just a single number. The number would usually be included within some set of directions, and then the directions would be executed.

USE OF CLEAR

The CLEAR key clears the display, but leaves the memory unaltered. It operates immediately and does not have to be followed by EXECUTE. An end-of-line symbol (⊢) appears in the display when CLEAR is actuated, which indicated that the calulator is idle. It is not necessary to clear the display before keying the next direction as long as the previous direction has been executed. In this case use of CLEAR is optional. If no subsequent execution has taken place since the last direction was keyed, then CLEAR must be used. These keys will be printed, and subsequent tracing will cease.

MAKING ARITHMETIC CALCULATIONS

For arithmetic, the fundamental user operation consists of writing an arithmetic expression into the display and then actuating the EXECUTE key, to instruct the calculator to evaluate that expression. An arithmetic expression is written into the display by pressing keys in the same order as they would be written on paper, one key per character or symbol. The arithmetic expression may then be executed by simply pressing the EXECUTE key. This is illustrated by the keying sequences and displayed answers given below.

| Keying Sequence | Displayed Answers |
| --- | --- |
| 3 + 6 EXECUTE | 9.00 |
| 9 . 3 − 6 EXECUTE | 3.30 |
| − 7 EXECUTE | −7.00 |
| 6 * ( − 7 ) EXECUTE | −42.00 |
| 8 . 2 5 * 4 EXECUTE | 33.00 |
| 6 * 3 / ( 1 1 − 2 ) EXECUTE | 2.00 |
| √ 3 EXECUTE | 1.73 |
| √ 4 + 5 EXECUTE | 7.00 |
| √ ( 4 + 5 ) EXECUTE | 3.00 |

As in the above examples, quantities in parentheses are treated as one quantity. Thus √(4+5) is equivalent to √9, whereas, √4+5 adds 5 to the square root of 4. The expression 4(3+2) is the equivalent of the expression 4*(3+2). Use of the multiplication operator is implied and is therefore optional in such cases. Parentheses can be nested (i.e., parentheses inside parentheses, etc.) but they must always be balanced, that is, there must be the same number of left-handed parentheses as there are right-handed.

THE ARITHMETIC HIERARCHY

When an arithmetic expression contains more than one operator, as do several of the preceding examples, there is a prescribed order of execution. An expression must be properly written or the answer will be wrong. The order of execution, known as the hierarchy is shown below:

1. Mathematical functions such as square root;
2. Implied multiplication;
3. Multiplication and division; and
4. Addition and subtraction.

Where an expression contains two or more operators at the same level in the hierarchy, they will be executed in order from left to right. The use of parentheses enables the order of execution to be changed. Thus, in the expression √(4+5) the addition operator is executed before the square root operator even though the addition operator occupies a lower level in the hierarchy.

EXCEEDING THE LENGTH OF THE DISPLAY

The length of an expression is not limited to the length of the display. As each excess symbol is keyed, the display shifts left to make room. The maximum allowable length for an expression varies between 35 and 69 keystrokes, depending upon the nature of the expression. If too many keys are pressed the display shows NOTE 09 (see the section on diagnostic notes below). Depending upon the nature of the expression the note may appear either before or after the EXECUTE key is pressed. In either case, the operator must press CLEAR and write a shorter expression.

MAKING CORRECTIONS

The BACK and FORWARD keys enable a displayed expression to be altered or corrected without re-keying the entire sequence. If a wrong key is pressed when writing an expression, it can be corrected immediately by pressing the BACK key followed by the correct key, as illustrated below:

| Keying Sequence | Display |
| --- | --- |
| 2 + BACK * 4 | 2 * 4 |

A displayed expression can be blanked, key by key in reverse order, by pressing BACK once for each displayed key. The blanked keys can then be returned to the display one at a time by pressing FORWARD. If an expression contains a wrong key, press BACK until that key is blanked, press the correct key and then press FORWARD to return each subsequent key (or, if extra keystrokes are required, key in the remainder of the expression). For example, if the number 123456789 is keyed incorrectly into the display as 123444789, the error may be corrected as indicated by the following steps:

| Keying Sequence | Display |
| --- | --- |
| BACK BACK BACK BACK BACK | 1234 |
| 5 6 FORWARD FORWARD FORWARD | 123456789 |

If the incorrect expression has been executed but no key has since been pressed, the expression can be returned to the display (by pressing BACK), corrected as before, and then again executed.

Any line of a stored program may be recalled into the display and then completely blanked by repeatedly actuating the BACK key. One additional actuation of the BACK key will bring the entire next preceding line of the stored program into the display. It is then possible to backstep through that line and bring its predecessor into the display, etc. Analogously, the FORWARD key may be repeatedly actuated to bring those lines succeeding the current line into the display.

To remove a portion of a line the BACK key is repeatedly actuated until the right most character, symbol or mnemonic of the portion to be deleted becomes the right most item in the display. The DELETE key is then actuated once for each character, symbol or mnemonic to be removed. Then, if the right most item of the line is not visible in the display, the FORWARD key is repeatedly actuated. The user may then continue writing the line, execute it, or store it, as appropriate. For example, assume it is desired to delete the underlined portion from the following line:

FXD 2;X→Y;PRT (A+B)/A;GTO 4

This is accomplished by repeatedly actuating the BACK key until the display appears as follows:

;X→Y;PRT (A+B)/A

Next, the DELETE key is actuated thirteen times. At first the display shifts to the right to bring the first part of the line into view, which in this case is FXD 2. However, FXD will not appear until there is room in the display for all four characters plus the space between D and 2. After this first part of the line comes into view, the line appears to shorten by losing an item from the right-hand side of the display each time the DELETE key is actuated, while the rest of the line remains stationary. After the segment has been deleted, the FORWARD key is repeatedly actuated until the end of the now modified line comes into view as follows:

FXD 2;GTO 4

The user may now continue writing this line, execute it, or store it, as he desires.

To add a segment to the interior of a line the BACK key is repeatedly actuated until the right most item visible in the display is the character, symbol or mnemonic immediately preceding the segment sought to be added. The INSERT key is then actuated and followed by the keys which describe the desired segment. The FORWARD key is next repeatedly actuated until the end of the line is in view. As the keys following INSERT but preceding FORWARD are actuated their mnemonics are inserted into the line with no loss of any other items in the line. The right-hand portion of the line is shifted to the right to make room for the additional items being inserted. This action continues until one of the keys, BACK, FORWARD, DELETE, CLEAR, EXECUTE or STORE is actuated. Generally the insertion of a portion of a line is terminated with the FORWARD key to return to the end of the line. For example, assume it is desired to insert the portion

2φ→B into the line

1φ→A;3φ→C

To accomplish the insertion, the BACK key is repeatedly actuated until the semicolon becomes the right most item in the display. The INSERT key is then actuated and followed by the key sequence 2φ→B. Next, the FORWARD key is actuated until the entire line is visible as follows:

1φ→A;2φ→B;3φ→C

If an error is made by the user during the entry of a portion of a line being inserted into an existing line, the erroneous items may be removed by actuating the DELETE key. The user may then continue writing the desired line portion after actuating the INSERT key.

In addition to modifying individual lines of a program as discussed above, it is also possible to insert entire lines into or delete entire lines from, the interior of a program stored in memory. If it is desired to add a line between existing lines 4 and 5, the added line would become new line 5 while the old line 5 would become the new line 6. Similarly, if it is desired to remove line 3 from a program, the old line 4 would become the new line 3, the old line 5 would become the new line 4, etc. In both cases the number of available R registers is automatically adjusted after the change.

To insert a line into a program the program line counter is first set to the line number which will be associated with the new line. This may be accomplished, for example, by actuating the GO TO key followed by the number keys representing the line number followed by the EXECUTE key. The new line is then written into the display and followed by sequential actuation of the INSERT and STORE keys. The new line becomes stored, and all succeeding lines of the program together with their line numbers are shifted to provide room.

To delete a line from a program the program line counter is first set to the line number of the line to be deleted. Sequential actuation of the RECALL and DELETE keys will remove the line and shift all succeeding lines and their line numbers to close the gap.

THE DATA MEMORY

The basic calculator contains 179 registers: six storage and working registers (A, B, C, X, Y and Z) and 173 program and data storage registers (R0 through R172). An additional 256 R-registers (R173 through R428) may be added giving a total of 435 registers.

The A, B, C, X, Y and Z registers are selected by pressing the A, B, C, X, Y and Z keys, respectively, while the R registers are selected by pressing the R( ) key followed by the appropriate number keys 0 through 172 or 428. The argument of the R( ) key may be a computed quantity. For example, sequentially pressing the R( ), (, 7, 0, /, 2, and ) keys denotes the R35 register. The argument of the R( ) may also be a variable. Then, if register A contains the number 15, sequentially pressing the R( ) and A keys denotes R15 register. Similarly, if the R5 register contains the number 10 and the C register contains the number 25, sequentially pressing the R( ), (, R( ) 5, +, C, and ) denotes the R35 register.

The register denoted by the keying sequence R( ), R( ), R( ) ... R( ) followed by one or more number keys is determined by the number designated by the number keys and by the numbers contained in the various registers. For example, the keying sequence R( ), R( ), 2 denotes the R8 register if R2 contains the number 8.

When the number following the R( ) key does not have a strictly integral value, the fractional part of the value is ignored. Thus, the keying sequence R( ), 3,5,6, ., denotes the R35 register. A plus sign immediately following the R( ) key is dropped when the line containing it is stored. Thus, the keying sequence R( ), +, /, % is stored as R( ) 35. A minus sign immediately following the R( ) key is not permitted, and causes a syntax error (NOTE φ1) If the R( ) key is followed by a quantity whose value is either negative, or greater than the number of available R registers, an error during execution results (the indication will be either NOTEφ5 or NOTE φ6, depending upon the exact circumstances).

Some of the plug-in read-only memory modules require part of the memory for their own use. When one of these modules is installed, it automatically takes the required registers, starting at the highest numbered register and working downwards. Those registers are then temporarily not available for program or data storage, until the module is removed.

When programs are stored they start in the highest-numbered available R-register and sequentially fill the memory downwards. Programs cannot be stored in the A, B, C, X, Y and Z registers. It is, therefore, most convenient to store data first in the A, B, C, X, Y and Z registers and then in the lower numbered R-registers. If the memory contains no program (i.e. at turn-on, or if ERASE has been pressed), then all registers except those required by a plug-in read-only memory module will be available for data storage. If the memory does contain a program, then the higher-numbered registers will not be available for data diagnostic NOTE φ6 will be displayed if the operator attempts to store data in a register which is not available.

The number of available R-registers can be determined at any time by pressing CLEAR LIST STOP. The printer will start to list the program (the STOP saves having to wait for the whole program to be listed). At the bottom of the list will be a number preceded by the letter R indicating the number of R-registers available. (The lowest-numbered register is R0; substract 1 from the number printed to obtain the name of the highest-numbered register available for data storage).

STORING DATA

One register can contain one data-number. It is not necessary to clear a register before storing a number in it because the number being stored automatically substitutes for the existing stored number. the entire memory is, however, cleared at turn-on or if ERASE is pressed. Storing data requires use of the →key. For example, pressing $$12.6 \rightarrow A \quad \text{EXECUTE}$$

stores 12.6 in the A register. Similarly, pressing $$6 \rightarrow X \quad \text{EXECUTE}$$

stores 6 in the X register, and pressing $$19 \rightarrow R()12 \quad \text{EXECUTE}$$

stores 19 register R 12. A stored number may be viewed by using either the DISPLAY or the PRINT keys. For example, pressing $$\text{DISPLAY A} \quad \text{EXECUTE}$$

displays the number currently stored in A (the number remains stored in A). Simiarly, pressing $$\text{PRINT R()12} \quad \text{EXECUTE}$$

prints the contents of R 12 (the number remains stored in R12).

IMPLIED Z

In general, if a stored number is to be kept for any length of time it should not be stored into the Z register because the result of any arithmetic expression is automatically stored in Z if no othr storage location is specified, thus $$14.2 \quad \text{EXECUTE}$$

is equivalent to $$14.2 \rightarrow Z \quad \text{EXECUTE}$$

Both expressions result in a display 14.2 which is also stored in the Z register. Similarly, $$3*4 + 16/3 \quad \text{EXECUTE}$$

8 is equivalent to $$3*4 + 16/3 \rightarrow Z \quad \text{EXECUTE}$$

A statement involving numerical activity usually contains an instruction, such as PRT, DSP, or →. If there is no such instruction, the form <quantity>→Z; or <mathematical expression>→Z, is usually automatically assumed when the line is executed or stored.

The automatic addition of Z onto the end of a statement is called the 'implied store in Z'.

For instance, if the operator presses A EXECUTE to view the contents of A, the line A→Z is what is actually executed. The contents of A are seen because that is the numerical quantity associated with the last assignment instruction executed in the line. Meanwhile, the contents of Z have been replaced by those of A, and are lost. The recommended procedure for viewing the contents of a register is to use the PRINT or DISPLAY statements, as they do not disturb the contents of any registers.

Because of the implied store into Z, the Z register is not recommended for storing data during calculations performed from the keyboard, except in certain situations. For instance, suppose the operator wished to add a series of numbers; $n_1, n_2, n_3, \ldots$ To do this, the register is first set to zero by executing the line 0→Z. Then, the numbers are added in the following manner:

$$n_1 + Z$$
$$n_2 + Z$$
$$n_3 + Z$$

Because of the implied store into Z, this is what is actually happening:

| $n_1 + Z \rightarrow Z$ | $n_1 + 0 \rightarrow Z$ |
| $n_2 + Z \rightarrow Z$ | $n_2 + n_1 \rightarrow Z$ |
| $n_3 + Z \rightarrow Z$ | $n_3 + (n_1 + n_2) \rightarrow Z$ |

REGISTER ARITHMETIC

Arithmetic expressions may be written using register names instead of actual numbers. When the expression executed, the values currently stored in those registers will be automatically substituted for the register names in order to evaluate the expression. For example, assume the user has made the following storage assignments:

12.6    A
6    in    X
19    in    R12

With the above values stored, the keying sequence $$A + R()12 - X \quad \text{EXECUTE}$$

would be equivalent to the keying sequence $$12.6 + 19 - 6 \quad \text{EXECUTE}$$

Other values stored in these registers would, of course, give a different result for the same expression.

Numbers and register-names may be mixed in an expression, as follows:

$$.3*12.6 + 4 - 6 \quad \text{EXECUTE}$$

FIXED- AND FLOATING-POINT NUMBERS

Numbers can be keyed into the display and displayed in either fixed point or floating point notation. In fixed-point notation, a number appears in the display as commonly written, with the decimal point correctly located. Floating-point numbers are written with the decimal point immediately following the first digit (discounting leading zeros) and with an exponent. The exponent, which represents a positive or negative power of ten, indicates the direction, and the number of places, that the decimal point should be moved, to express the number as a fixedpoint number. In the calculator the exponent may be any integer within the range −99 to +99. Examples of fixed point and floating point notation follow:

| Fixed | | Floating |
|---|---|---|
| 1234.5 | = | $1.2345 \times 10^3$ |
| 0.0012345 | = | $1.2345 \times 10^{-3}$ |
| 1.2345 | = | $1.2345 \times 10^0$ |

(exponent)

The FIXED N key selects fixed point display of displayed results. The letter N indicates that the key must be followed by one of the number keys (0 through 9) to select the number of digits to be displayed to the right of the decimal point.

The FLOAT IN key operates in the same way as FIXED N except that floating point display is selected, with N designating the required power of ten. (When the calculator is turned on, FLOAT 9 is automatically assumed.) For example, the number 123.456789 in float 9 notation be displayed as 1.23456789$\phi$E$\phi$Z. The letter E in the display indicates that the next two digits constitute the exponent. If the exponent is negative a minus sign follows the E, as illustrated below.

| Keying Sequence | | Display |
|---|---|---|
| 0 0 1 2 3 4 | EXECUTE | 1.234000000E-03 |

No more than ten significant digits can be displayed; therefore if a number becomes too large to be properly displayed as a fixed point number, it will be automatically displayed as a floating point number. If the number becomes too small, only zeros are displayed but the number may still be seen if floating point notation is then selected.

The ENTER EXPONENT key is used to designate the E (exponent) when numbers are being keyed in floating point form, as illustrated below:

| Keying Sequence | | Display |
|---|---|---|
| 2 . 5 6 | FLOAT N 4 EXECUTE | |
| | ENTER 2 EXP EXECUTE | 2.5600E 02 |
| 4 . 7 3 | ENTER -2 EXP EXECUTE | 4.7300E-02 |

RANGE OF CALCULATION

The range of the calculator is from $\pm 10^{-99}$ to $\pm 9.999999999 \times 10^{99}$; when this range is exceeded during a calculation diagnostic NOTE 10 is displayed. Calculations which normally result in zero, such as subtracting a number from a number equal to itself, do not exceed the range.

OPERATING THE PRINTER

The print key is used to print both numerical values and alphameric messages (the form of a numerical printout is changed by the FIXED N and FLOAT N keys in the same way as the display is changed). This is illustrated by the following examples (in which it is assumed the FIXED N key, 2 key and EXECUTE key have previously been pressed to determine the form of the printout):

| Printing Operation | Keying Sequence | Printout |
|---|---|---|
| Print A Number | PRINT 1 2 3 EXECUTE | 123.00 |

Print result of a calculation

PRINT 6 + 8 / 2 EXECUTE 10.$\phi\phi$

Print contents of a storage register

PRINT A EXECUTE (CONTENTS OF A)

To print an alphanumeric message requires the use of the quote key (" ") to both start and end the message (the quote symbol is not printed) as illustrated by the following example:

Keying Sequence

PRINT "M E S S A G E MESSAGE SPACE N O . 2 " EXECUTE

Printout

MESSAGE NO. 2 no more than sixteen characters (including spaces) can be printed on one line of a message, and each line must be enclosed in quotes. When followng the same PRINT instruction, lines must be separated by commas, as indicated below:

PRINT "---", "---" EXECUTE

This prints two lines. If messages and values are to be mixed, they must be separated by a comma as illustrated by the following example in which it is assumed that the number 456 has been stored in the A register.

PRINT " A = ", A EXECUTE A=456.$\phi\phi$

Pressing the SPACE N key followed by one or more number keys designating any one of the numbers 0 through 15 causes the printer to space vertically (the number key specified in the number of lines spaced). This is illustrated by the following example:

| Keying Sequence | Printout |
|---|---|
| PRINT " D A Y S " EXECUTE | DAYS |
| SPACE N 2 EXECUTE | |
| PRINT 4 EXECUTE | 4.00 |

When used in a message, most keys result in the character printed being the same as the character on the key. The following keys are the exceptions:
1. SPACE prints one blank character-space
2. GO TO prints ⱶ
3. R( ) prints :
4. STOP prints !
5. ENTER EXP prints |

The following keys either cannot be used in a message or they result in some meaningless character being printed:
1. All of the half-keys at the top of the keyboard and the four blank keys in the left-hand keyblock.
2. The EXECUTE key, RUN PROGRAM key, and STORE key.
3. The JUMP key, END key, IF key, GO TO/SUB key, FLAG N key, RETURN key, and SET/-CLEAR FLAG N key.

PROGRAMS

A program enables the calculator to automatically execute the keys necessary to solve a particular problem. First the program must be loaded into the calculator's memory to teach the calculator which key sequences are required and the order in which they are to be executed. Once loaded, the calculator can remember that program until a new one is loaded over it or until the calculator is switched off. A program need not be keyed into the calculator more than once because a loaded program can be recorded on magnetic cards. Recorded programs may then be loaded back into the calculator any time in the future. Once the program has been loaded, it is initialized, and then execution is commenced by actuating RUN PROGRAM key.

A complete program consists of lines of program information, each of which may be separately loaded into the calculator memory from the keyboard by actuating the STORE key when the line has been completed. An end-of-line symbol ⊢ is automatically displayed at the end of each line after that line has been stored. A program line counter keeps track of which line of a program is currently being executed or is about to be executed or stored next. Before storing a line into the calculator memory, it may be edited with the aid of the BACK, FORWARD, CLEAR, DELETE and INSERT keys. After all lines of the program have been stored, individual lines may be recalled into the display for editing or other purposes. Recall is accomplished by sequentially actuating the CLEAR and GO TO keys followed by the number keys representing the line number of the line to be recalled followed, finally, by the RECALL key. When restoring the recalled line or the edited version thereof it is only necessary to actuate the STORE key.

MAGNETIC PROGRAM CARDS

A magnetic card 16 such as that shown in FIG. 1 is used to permanently or temporarily store programs or data. The card has two sides that may be used independently to store either data or programs (however, data and programs cannot be mixed on the same side of the card). Once a recording has been made on a card-side, that card-side can be protected from erasure by tearing out a corresponding protect tab on the card. The recording on a protected card side cannot be changed.

A program loaded into the memory may be recorded on a magnetic card 16 by pressing

END    EXECUTE    RECORD    EXECUTE to start the card-reader motor and by then inserting an uprotected card into the card reader. The program from the card may be loaded back into the memory by first sequentially pressing the ERASE key to clear the memory, by then pressing the END, EXECUTE, LOAD and EXECUTE keys, and by thereupon inserting the card into the card reader.

THE PROGRAM LINE

Even though the lines of a program are stored in the same memory as data, the length of individual lines bears no relationship to the length of a register. The calculator simply uses however many registers are necessary to accommodate a particular line. The length of a line is determined by the programmer and depends upon the requirements of his program. However, the length is limited by machine requirements, in the same way that an individual expression is limited (see Exceeding the Length of the Display). Diagnostic NOTE 09 appears either before or after STORE is pressed, if the line is too long. When NOTE 09 appears the operator should press CLEAR and key in a completely new (shortened) line.

Line numbers are automatically assigned, by the calculator, in strict numerical sequence, beginning with line 0. The operator must know that line numbers will be assigned if there are any GO TO statements in his program. The line numbers are not strictly a part of the program because they will automatically change if the program is moved to a different location in memory. For example, suppose a program (No. 1) is a ten-line program (lines 0 through 9) and is already stored in the memory. If a second program (No. 2) is now loaded below program No. 1, then the first line of program No. 2 will be line 10, whereas, if program No. 2 had been the only program in the memory, then its first line would have been line 0. (Any GO TO statements must be corrected, by the programmer, to reflect any such line number changes.)

A line can have one or more statements, separated by semicolons. The actual number of statements on any one line is generally not significant, it being more important to have the statements in the correct order rather than on a particular line. Position of a statement does become significant where a line contains an IF statement or where a branch is to be made. In the former case, those statements which are to be conditionally executed must be on the same line as the IF statement and must come after the IF. In the latter case, a branch is always made to the beginning of a line. Therefore, the first statement to be executed after a branch must be the first statement of the line to which the branch is made. It is recommended that not too many statements be put on one line because a short line is easier to change (once stored) than a long line.

THE DATA ENTRY STATEMENT

Program statements resulting from actuations of the ENTER key are used to halt the program during execution so that the user can key in data. The simplest statement contains only a register name, which is displayed when program execution is halted. The data keyed during the halt is stored, into the register designated, when RUN PROGRAM is subsequently pressed. For example, ENT A; results in the keyed data being stored in register A. An enter statement may contain several register names (which must be separated by commas). The program will halt for each register in turn. For example, ENT A, R13, X; is the equivalent of the three separate statements ENT A; ENT R13; ENT X; A label (followed by a comma) may precede the register name. In this case the label will be displayed, instead of the name, when the halt occurs. For example, ENT "A=?", A; displays A=?and stores the subsequent data entry into register A.

BRANCHING

Program lines are normally executed in numerical sequence. However, some statements cause the sequence of execution to be changed. This is known as branching (instead of the program going to the next sequential line, it branches to some other specified line and continues program execution there). There are two kinds of branching, conditional and unconditional. Unconditional branching is accomplished with the GO TO, JUMP and GO TO SUB keys while conditional branching is done with the IF key.

There are three types of unconditional branching with GO TO. The first type is an absolute GO TO. On absolute GO TO statements take the form GO TO N, where N is an integer that refers to a particular program line. The second type is a relative GO TO. The form of the relative GO TO statement is GO TO + N or GO TO − N, where N is an integer. This means to skip forward or backward N program lines. The third type is a GO TO label. This type of GO TO statement takes the form GO TO "LABEL", where LABEL is any unique alphameric group of characters and must be enclosed in quotes. The number of characters in the label is virtually unlimited, however, the calculator will only look at the last four characters in the label. When a GO TO "LABEL" statement is executed the program will branch to a progrm line with "LABEL" as the first statement of that line, where LABEL has the identical last four characters as the original GO TO "LABEL" statement. If two lines have the same label branch execution will always go to the first label.

In a program, a GO TO statement causes program execution to continue with the line whose number is specified. When a GO TO statement is entered from the keyboard and followed by the RUN PROGRAM key, the GO TO statement causes program execution to start at the line whose number is specified. However, when a GO TO statement is entered from the keyboard and followed by the EXECUTE key, the GO TO STATEMENT causes the calculator to go to the line specified but not to start program execution. Any subsequent activity then depends upon the next key pressed. A line number is valid only if a current stored program has a line identified by that number, or if it is the next higher number after the number identifying the last stored line. All other numbers are non-valid and, if used in a GO TO statement, will cause diagnostic NOTE 08 to be displayed.

JUMP allows relative branching. But, unlike the GO TO, can have a numeric constant, a register or any legitimate calculator expression as a parameter. JUMP-6 on execution would go back six lines in the program. If the contents of A were 6.23 then JUMP A would jump the integer value of A lines, or in this case 6 lines in the program. If A were 6.23 and B were 2, then JMP (A + B) would be acceptable and would jump eight lines on execution.

Often it is desirable to execute the same operations at several places in a program. One could simply repeat a group of program lines as needed, but this can be time consuming and error prone. More important, unnecessary repetition of program lines wastes memory space. The calculator has the capability to store a set of program lines once, and allow a program to execute this set of lines many times. Such a group of program lines is clled a subroutine.

Once a subroutine has been written and stored in memory, execution may branch to the subroutine from a program. This is known as calling a subroutine. The program which calls the subroutine is usually referred to as the mainline program or calling program. When the subroutine execution is completed a branch is made back to the calling program and mainline execution is resumed where it was interrupted by the subroutine call. The branch from the subroutine to the mainline program is called a return. Note that if a subroutine is called in line N; the return is made to line N + 1.

Branching to a subroutine is accomplished by using the GO TO SUB. GO TO SUB works almost exactly like GO TO and may branch to an absolute, relative or "LABEL" address. The difference between GO TO and GO TO SUB is that when a GO TO SUB is used for a branch, the calculator stores the line number for the return branch address. To make the return branch RETURN is stored at the end of the subroutine. The calculator itself will provide the address for the return branch.

The IF statement allows the powerful feature of conditional branching in the calculator enabling the calculator to decide whether or not to execute the succeeding statement(s) on the same line as that IF statement. The general form of the IF statement is IF followed by a condition completing the statement. (For Example, IF A−B;). The line in which the IF statement appears may be completed with any other statements. The operation will be as follows. First the condition immediately following the IF will be evaluated to check the truth of the condition. If the condition is true, the statements following the IF statement are executed, and if the condition is false, execution immediately goes to the next line. Thus, in the example given above, A = B is first computed to determine whether the contents of the A register equal the contents of the B register. If this condition is true, the rest of the line would be executed. If it is false, the rest of the line would be ignored and execution would go immediately to the next line.

The conditions in IF statements all use one of the following keys to test the relationship of any two values, registers, arithmetic expressions, or flags:

1. $>$ (greater than)
2. $\leq$ (less than or equal to)
3. $=$ (equal to)
4. $\neq$ (not equal to)

If the relationship is the same as that indicated by the key used an answer of true (one) will be given and if not an answer of false (zero) will be given. For example, if the contents of A and B were 2 then $$A = B \rightarrow C$$

would store 1 in C, $$A \neq B \rightarrow C$$

would store 0 in C, and $$A + B = A \rightarrow C$$

would store 0 in C.

Again, these can be used in any expression $A + B (A = B) + AB (A \leq B) + (A + B + C)(A > B) \rightarrow C$ would store $2 + 2(1) + 4(1) + 6(0)$ which is 8 in C.

THE STOP AND END STATEMENTS

The STOP key, used as a statement in a program or pressed while a program is running, halts program execution. STOP should be used only to abort a program (in the sense that it is no longer desired to run the program, or that it is desired to start execution again at the beginning).

The END key serves the dual purpose of halting program execution and of initializing the calculator for commencing program execution at line 0.

THE FLAGS

The calculator makes sixteen flags available to the user as selected by the FLAG N key followed by numeric keys to designate one of the flags 0 through 15. For example, actuation of the FLAG N 4 selects flag 4. Flags are used generally as part of an IF statement to enable the user to define some special condition.

The calculator terminology used to describe flags is quite simple: If a flag is raised, it is set; a set flag is considered to have the value 1. If a flag is lowered, it is cleared; a cleared flag is considered to have the value 0.

Flags are set and cleared by means of the SET/CLEAR FLAG N key. This key is actuated once to set a flag and twice to clear it. For example, a single actuation of the SET/CLEAR FLAG N key followed by the 1 and 2 number keys sets flag 12. Similarly, a double actuation of the SET/CLEAR FLAG N key followed by the 7 key cleared flag 7. Once set, a flag remains set until it is deliberately cleared. However, all flags are automatically cleared at turn-on, or when ERASE is pressed, or when an END statement is executed.

As long as no program is being executed, the state of any flag can be examined actuating the FLAG N key followed by number keys representing the flag in question followed by the EXECUTE key. The state (value) of the flag will then be displayed. Such a test will not change the state of any flag.

In addition to their normal use, flags 0 and 13 also have a special purpose. Flag 0 may be set from the keyboard while a program is actually running, by pressing the SET/CLEAR FLAG N key. Flag 13 is set automatically if the program halts for an ENTER statement and the RUN PROGRAM key is then actuated without any data being keyed.

LIST MODE

The LIST key facilitates printing by means of the calculator printing unit a program listing of an internally stored program. The listing includes the line number of each line together with an alphameric mnemonic representation of the line. An indication of the number of storage registers remaining is printed at the end of the listing.

Program listing is accomplished by first setting the program line counter to the line at which listing is to commence. This may be done by actuating the GO TO key followed by the number keys representing the line number followed by the EXECUTE key. Next, the LIST key is actuated to begin the listing operation, which will terminate at the last program line stored.

TRACE MODE

A trace mode of the calculator enables the user to obtain a printed record of its operation. The form of this printed record is a function of the type of operation in progress.

The calculator may be placed in the trace mode by actuating the TRACE key followed by the EXECUTE key or by program execution of a TRACE command. The calculator may be returned to normal mode by actuating the NORMAL key followed by the EXECUTE key or by program execution of a NORMAL command. The calculator is automatically placed in the normal mode when it is turned on.

While in the trace mode, the calculator prints a representation of each line execution from the keyboard and the results of those executed statements which produce a quantity that is considered a result. A few keys, such as CLEAR, are not printed.

The following example is illustative of the printout obtained when the calculator is operating in the trace mode:

| | |
|---|---|
| 0→A;0→BI – | |
| | 0.00 |
| | 0.00 |
| A + 1→A; B + 10→BI – | |
| | 1.00 |
| | 10.00 |
| A + 1→A; B + 10→BI – | |
| | 2.00 |
| | 20.00 |
| PRT "A = ", A, "B = ", | |

| | |
|---|---|
| -continued | |
| BI – | |
| A = | 2.00 |
| B = | 2.00 |

While running a program in the trace mode the calculator prints the line number of each line as it is executed, and below that, any quantities that were stored into registers by that line. Running a program in the trace mode may be very helpful in debugging a program by analyzing the numbers stored during the execution of the program. A program may, without alteration, be run in the trace mode simply by sequentially actuating the TRACE and EXECUTE keys before execution of the program is begun. In addition, the calculator may be placed in the trace mode during execution of any program which does not contain a NORMAL statement by simply actuating the TRACE key. It is not necessary to halt execution of the program first.

PLUG-IN READ-ONLY MEMORY MODULES

The calculator's User Definable Functions Accessory includes a 1024-bit plug-in ROM with three 10 key overlays shown in FIGS. 10A-E. Five keys are used for control and twenty-five keys are available for definition if no other plug-in ROM's are in the machine. Fifteen keys are available if one other plug-in ROM is used and five are available if both other ROM slots are used. The uses of this accessory are described below.

In a program it frequently happens that some basic calculation is needed at several different places. It is clumsy, wasteful and error prone to duplicate the necessary statements each time they are needed. It is easier and more desirble to write them once and refer to the statements as the calculation is required. This capability is provided by subroutines and functions. Here we describe the basic subroutine and function capabilities of the calculator and how they are extended with the USER DEFINABLE FUNCTIONS accessory.

The calculator has basic subroutine capabilities provided by the GO SUB and RETURN keys. These keys allow one or more lines in the main program to be called as a subroutine by jumping to the first line with the GO SUB statement and returning to the main program by executing a RETURN statement. For example, it may be necessary to set the first ten R register to zeros at several places in the program. This job can be accomplished with the following program using a subroutine labeled "ZERO" as follows:

| | |
|---|---|
| 0: GO SUB "ZERO" | |
| 20: CO SUB "ZERO" | Program with three calls to "ZERO" |
| 35: CO SUB "ZERO" | |
| 40: "ZERO" | |
| 41: 10 → Z | Subroutine zero |
| 42: Z–1 → Z; 0→RX; IF Z>0; CTO + 0 | |
| 43: RETURN | |

The calls to "ZERO" from lines 0, 20 and 35 cause the ten R registers to be cleared before returning to lines 1, 21, and 36, respectively. The usage of subroutine "ZERO" clearly saves space since the code in lines 41 through 43 need not be duplicated. In addition, as the program is segmented ino subroutines it becomes easier to read and understand. If the subroutine is useful to others, it may be incorporated in their programs not only to save space but to save time writing their programs.

In the simple example, subroutine "ZERO" always does *exactly* the same job: setting the first ten R registers to zero. A more general subroutine would have the capability to set any ten consecutive R registers to zeros starting at R(J). To accomplish this, the subroutine must be altered and the value of the *parameter* J must be known by (or passed to) the subroutine. This value could be stored in the X register before calling the subroutine and the program could be changed as follows:

0: 0→X; GO SUB "ZERO 1"

20: 40ΔX; GO SUB "ZERO 1"

35: 30→X; GO SUB "ZERO 1"

40: "ZERO 1"

41: 10→Z

42: Z − 1 → Z; 0 → R(X+Z), if Z>0; GTO + 0

43: RETURN

The subroutine "ZERO 1" clears R registers 0-9, 40-49 and 30-39 in lines 0, 20 and 35, respectively. The programmer must be careful, however, since the subroutine uses both the X and Z registers. These registers must be saved if they contain valued information when the subroutine is called. This bookkeeping complicates using the subroutine and makes it less attractive and more conductive to errors. The problems become even worse as more parameters must be passed to the subroutine and as more working registers, such as Z, must be made available. These problems are circumvented by using advanced features found in the USER DEFINABLE FUNCTION ROM.

In addition the USER DEFINABLE ROM includes the concept of a function. A function differs from a subroutine in that the name of a function has a value associated with it. Therefore, function names can appear in any arithmetic expression to reference the value associated with the functions such as the names A, B, C, X, Y, Z, and R are used for registers. For example, SIN, COS, LN and EXP are functions which have values associated with their names and

SIN (LN A) − COS (EXP B) → X is a valid arithmetic statement containing several functions.

While some standard functions are built in to the calculator, it is desirable to be able to define other functions and have them work in the same manner that the functions sin, cos, ln, exp, etc. work. For example, if a solution of a problem required hyperbolic functions, it would be desirable to define the functions and write statements like

SINH (A + B) − COSH (A −B) → X

The problems encountered in defining functions are similar to those of writing subroutines. Parameters of functions (arguments) must be known by or passed to the function and the working registers must be made available to the function so temporary results may be stored during the calculations. Defining functions differ from defining subroutines in that the value must be assigned to the function. The USER DEFINABLE FUNCTION block provides capabilities to solve these problems.

The option block has key arrangements as shown in FIGS. 10A-E. Keys FA, FB, FC, FD and FE are assignable to any five subroutines or functions. GA through GJ and HA through HJ are also assignable in he absence of one or two other ROM blocks, thus extending the capacity to 15 or 25 functions or subroutines. The remaining five keys facilitate defining and calling these functions and subroutines.

Subroutines and functions that are defined with the USER DEFINABLE FUNCTION block are similar in structure to the main program: each routine is a list of one or more statements, numbered from zero, followed by an END. To define a simple subroutine to calculate the volume of a sphere and assign this subroutine to the FA key. First press

GTO FA EXECUTE

This places the machine in define subroutine mode related to key FA. Any other assignable key could be used in place of FA. Next, to define the subroutine for calculating the volume, STORE

0: 4/3* πZZZ→Z

1: END

Storing the END returns the machine to the normal mode of operation. To use this subroutine to calculate the volumeof a sphere with radius 5, press

5; FA EXECITE which is equivalent to

5→Z; GSB FA EXECUTE

The Z register is displayed. To call the subroutine from a program STORE

3: 5→Z; GSB FA

The five control keys (left keys of FIG. 10C) extend these basic subroutine capabilities to include immediate execute as well as parameter passing and function subprogram. These keys are described below.

CALL. To call a subroutine with parameters the CLL must be used. This key is used to indicate that a list of parameters will follow the subroutine name. Otherwise, the key is used exactly as GXB key. That is, GSB FA    (no parameters)

CLL FA (A, 5, B+X)    (parameters)

The CLL statement should be the last statement of a line. The parameters need not be enclosed in parentheses.

PARAMETER. The P() or parameter key is used to access parameters that are being passed to subroutines and functions and is probably the most heavily used key of this ROM block. In addition to accessing parameters, the P() key may be used to create and access memory that is used temporarily as working registers while the subrooutine is being executed. Accessing parameters and working registers is done with the P() key without affecting the A, B, C, X, Y, Z, or R registers.

The P() key is used exactly like the R() key but it references a sequence of parameters registers instead of the R registers. For example, if a subroutine FB is called with three parameters, P1 references the first parameter, P2 references the second, etc. That is,

```
CLL  FB   (A,   5,   X − B)
           ↓    ↓      ↓
           P1   P2     P3
```

In this CLL, P1 references the A register, P2 and P3 reference memory locations where 5 and the value of X-B are stored temporarily during the execution of subroutine FB. The calculation of X-B is made and placed in a temporary location each time the CLL statement is executed before executing subroutine FB.

Temporary working registers may be created and accessed by using the P() key with subscripts higher in value than the number of parameters being passed. For example, subroutine FB had three parameters (P1, P2, P3). P4, P5, etc. could be used as working registers. Obviously, the number of such registers is limited since the calculator will run out of internal temporary storage eventually. An exact limit cannot be given since it is dependent on the availability of memory when the subroutine is initiated.

As the first example, consider rewriting subroutine "ZERO 1" to zero the specified ten R registers without destroying the value of the X or Z registers as the previous routine did. One parameter P1 must be passed replacing X and one working register P2 is used in place of Z. The necessary statements follow.

| PRESS | GTO FA EXECUTE |
|---|---|
| STORE | 0: "ZERO" |
|  | 1: 10 → P2 |
|  | 2: P2 − 1→P2; 0→R(P1 + P2); IF P2>0; GTO + 0 |
|  | 3: END |

Then, CLL of the form

40→X; GO SUB "ZERO 1"

are replaced pressing

CLL FA 4 0 STORE which is displayed as

20: CLL ZERO 1 40 since the subroutine is started with the label "ZERO 1". The new routine operates as prescribed without destroying the values of either register X or Z freeing them for other purposes.

Another example is a routine to increment a register. The one parameter of this subroutine specifies the register to be incremented:

| PRESS | GTO FC EXECUTE |
|---|---|
| STORE | 0: "INCR" |
|  | 1: P1 + 1 . P1 |
|  | 2: END |

INCR may be called by

10: CLL INCR A to increment the A register or

20: CLL INCR R(A+B)

to increment the R register specified by A+B. This example shows that a parameter may be used to return a result as well as access a value. Any number of parameters may be used in calling a subroutine.

DEFINE. A function differs from a subroutine in that it has a value associated with its name and, therefore, can be part of an expression. The DEF/→F key allows functions to be defined in the calculator. The key has two uses as its label indicates. First, it is used to place the machine in function definition mode DEF. Secondly, once the calculator is in function definition mode, it is used to assign a value to the function →F.

To place the calculator in *function definition* mode,

PRESS   DEF FA EXECUTE

This is analogous to placing the machine in subroutine definition mode; that is pressing

GTO FA EXECUTE.

After placing the machine in function definition mode, the function is defined exactly as a subroutine with parameters except the →F allows a value to be assigned to the function.

As an example consider writing a function to define the hyperbolic sin function.

$$\text{Sinh } X \ [(e^x - e^{-x})/2]$$

as the FD key. First, to place the calculator in function definition mode,

PRESS   DEF FD EXECUTE

To define the sinh function,

| STORE | 0: | "SINH" |
|---|---|---|
|  | 1: | (EXP P1 - EXP(−P1) )/2→F |
|  | 2: | END |

To use the function, the FD key is referenced just like the SIN key. For example,

PRESS FD (5) + FD (4) EXECUTE which is displayed as
SINH (5) + SINH (4)

before EXECUTE is pressed since the definition begins with the label "SINH". Similarly, 5: SINH (A+B) / SINh (A−B) → A can be stored as a program line. The machine truly behaves as if it had a "built in" capability to calculate hyperbolic sines.

As a second example, the maximum value function is programmed. This function has two parameters and is assigned the value of the larger of the two parameters. First,

| | PRESS | DEF FE EXECUTE |
|---|---|---|
| and | STORE | 0: "MAX" |
| | | 1: P1 → F |
| | | 2: IF P2>P1; P2→F |
| | | 3: END |

Notice that P1 is assumed to be the larger of the two parameters in line 1, and line 2 makes a correction if this is not the case. This function can be used to calculate and store the product of two maximum values as follows:

MAX (6, 9) MAX (−5, −4) → RA or

MAX (AB − C, 5) MAX (Z ↑ 3, 5−A) → RC

Performing similar operations without using this function capability would require several registers to store intermediate results and would be very hard to read and understand in comparison.

SCRATCH. The SCR is used for several functions. Its primary use is to delete a user defined subroutine or function from memory to allow a key to be used for other programs or to increase the amount of memory available for the main program. To delete function FA,

PRESS SCR FA EXECUTE

To delete two (or more),

PRESS SCR FB, FC EXECUTE

Special functions of this key included recording and loading of programs. To record all programs in memory in the order stored,

PRESS GTO SCR; REC EXECUTE

To load these programs,

PRESS GTO SCR; LOD EXECUTE

To record one function or subroutine per one half card, place one subroutine or function in the machine and

PRESS GTO FA (OR OTHER KEY DEFINED); REC EXECUTE

Similarly, to configure a machine from a library created in this manner, order the functions and subroutines and PRESS

GTO FA; LOD EXECUTE

GTO FB; LOD EXECUTE

ETC.

To list function FA,

PRESS GTO FA LIST

The ability to configure the calculator in this manner makes it possible to customize the calculator from one problem to the next without reprogramming, entering and debugging the functions and subroutines needed. This ability combined with the capability of the calculator to modify the keyboard with a variety of plug-in ROMS allows versatility never before found in a calculator.

In summary, the USER DEFINABLE FUNCTIONS ROM for the calculator greatly extends the capabilities of the calculator. It has been shown how the block is used to write general purpose subroutines and functions. These routines communicate with the main program by parameter passing and allow working registers within the subroutine to be established and accessed. These features allow the user to define routines that do not require or destroy the content of the A, B, C, X, Y, Z and R registers. Therefore, the programmer is relieved of all the bookkeeping that is associated with calling a subroutine when parameters must be placed in specified registers; these registers usually have to be saved before storing parameters and restored after calling the subroutine. The programs written with this required bookkeeping become clumsy, obscure, hard to debug, and in general discourages the use of subroutines and functions.

Another advantage of the USER DEFINABLE FUNCTIONS ROM is its ability to define functions (subroutines that have a value associated with their names such as SIN and LN) that exactly imitate the behavior of the built in functions of the calculator. This allows the capabilities of the machine to be extended naturally when a problem that is based on different functions is encountered. The option block also allows a library of general purpose subroutines and functions to be established and used easily. This ability greatly emancipates the programmer by allowing him to borrow something written by another with a minimum of effort.

In general, the USER DEFINABLE FUNCTIONS extend the capabilities of the calculator to make the machine easier and more natural to program. It may be the user's most valuable addition to the calculator.

We claim:

1. An electronic calculator comprising:

keyboard input means for entering lines of alphameric information, including a line number, into the calculator;

memory means, coupled to said keyboard input means, for storing, separately and as part of a mainline program, lines of alphameric information entered into the calculator from said keyboard input means;

processing means, coupled to said keyboard input means and memory means, for processing lines of alphameric information entered into the calculator to perform selected functions; and output means, coupled to said processing means, for providing an indication of the result of selected functions performed by said processing means;

said keyboard input means including one or more definable keys and means for defining a plurality of functions and subroutines comprising lines of alphameric information and for storing each such defined function and subroutine in said memory means in association with selected ones of said definable keys;

said memory means including a first section for storing the lines of alphameric information comprising the defined functions and subroutines associated with said definable keys, and a second section for storing lines of alphameric information comprising a mainline program;

said processing means including logic means for assigning a sequence of line numbers to the lines of alphameric information comprising each of the defined functions and subroutines stored in the first section of said memory means, each such sequence of line numbers being independent of the sequence of line numbers of every other function and subroutine and independent of a sequence of line numbers associated with the lines of alphameric information stored as a mainline program in the second section of said memory means.

2. An electronic calculator as in claim 1 wherein:

said keyboard input means includes memory erase means for initiating erasure of the lines of alphameric information stored in the first section of said memory means; and said processing means is responsive to actuation of said memory erase means for erasing the lines of alphameric information stored in the first section of said memory means without thereby altering the contents of the second section of said memory means.

3. An electronic calculator as in claim 2 wherein:

said memory erase means includes first and second control keys; and said processing means is responsive to sequential actuation of said first and second control keys together with one or more of said definable keys for erasing the lines of alphameric information stored in the first section of said memory means that are associated with the one or more actuated definable keys without thereby altering the contents of the second section of said memory means.

* * * * *

UNITED STATES PATENT AND TRADEMARK OFFICE
CERTIFICATE OF CORRECTION

PATENT NO. : 4,145,752
DATED : March 20, 1979
INVENTOR(S) : Emil Edward Olander, Jr. et al It is certified that error appears in the above-identified patent and that said Letters Patent are hereby corrected as shown below:

Column 18, line 53, "fixedpoint" should be --fixed-point--;

Column 19, line 8, after "notation" insert --would--;

Column 19, line 15, "0    01234" should be --.001234--;

Column 19, line 15, "1.234000000-03" should be --1.234∅∅∅∅∅∅-∅3--;

Column 19, line 57, "123.00" should be --123.∅∅--;

Column 20, line 6, "MESSAGE" (second occurrence) should be deleted;

Column 20, line 47, "prints |" should be --prints ↑--;

Column 21, line 66, "that" should be --what--;

Column 22, line 43, after "ENTX;" insert a period;

Column 23, line 24, "current" should be --currently--;

Column 23, line 47, "clled" should be --called--;

Column 25, line 10, after "examining" insert --by--;

Column 26, line 2, "B1-" should be --B|— --;

Column 26, line 34, "desirble" should be --desirable--;

Column 26, line 54, "20:   CO SUB "ZERO"" should be --20:   GO SUB "ZERO"--;

Column 26, line 56, "35:   CO SUB "ZERO"" should be --35:   GO SUB "ZERO"--;

Column 27, line 14, "40ΔX" should be --40→X--;

UNITED STATES PATENT AND TRADEMARK OFFICE
CERTIFICATE OF CORRECTION

PATENT NO. : 4,145,752
DATED : March 20, 1979
INVENTOR(S) : Emil Edward Olander, Jr. et al It is certified that error appears in the above-identified patent and that said Letters Patent are hereby corrected as shown below:

Column 2, line 61, "input" should be --output--;

Column 3, line 40, "readonly" should be --read-only--;

Column 8, line 29, "modules" should be --module--;

Column 9, line 36, "R-bus" should be --$\overline{R}$-bus--;

Column 10, line 3, "R-bus" should be --$\overline{R}$-bus--;

Column 10, line 17, after "flip-flop" insert a period;

Column 10, line 17, after the period begin a new sentence and insert --The state of A/B flip-flop--;

Column 11, line 19, "POP" should be --$\overline{POP}$--;

Column 11, line 62, "soley" should be --solely--;

Column 12, line 36, "32,351.6" should be --32,341.6--;

Column 16, line 68, "the" should be --The--;

Column 17, line 44, delete "8";

Column 18, line 17, after "expression" insert --is--;

Column 18, line 23, after "12.6" insert -- in --.

Column 18, line 39, delete the comma before "3";

UNITED STATES PATENT AND TRADEMARK OFFICE
CERTIFICATE OF CORRECTION

PATENT NO. : 4,145,752
DATED : March 20, 1979
INVENTOR(S) : Emil Edward Olander, Jr. et al.

It is certified that error appears in the above-identified patent and that said Letters Patent are hereby corrected as shown below:

Column 28, line 32, "volumeof" should be --volume of--;

Column 28, line 45, "subprogram" should be --subprograms--;

Column 28, after line 45, insert the following paragraph:
--IMMEDIATE EXECUTE. The immediate execute key (displayed as IEX) is used in making the calculator respond immediately to the depression of a key without pressing EXECUTE. The IEX must be the first statement of the subroutine for the key to respond in this manner. When the key associated with such a subroutine is depressed, the routine is executed without pressing EXECUTE. For example, if the previous program was changed to

```
0:  IEX
1:  4/3*πZZZ Z
2:  END
``` then merely press

```
5 FA
``` to invoke the routine. This specialized execution mode is valuable in simplifying keyboard operation to increase efficiency and productivity when moving similar calculations must be made from the keyboard.--

UNITED STATES PATENT AND TRADEMARK OFFICE
CERTIFICATE OF CORRECTION

PATENT NO. : 4,145,752
DATED : March 20, 1979
INVENTOR(S) : Emil Edward Olander, Jr. et al It is certified that error appears in the above-identified patent and that said Letters Patent are hereby corrected as shown below:

Column 28, line 49, "GXB" should be --GSB--;

Column 28, line 63, "subrooutine" should be --subroutine--;

Column 29, line 33, "0:  "ZERO"" should be --0:  "ZERO 1"--

Column 30, line 40, "SINh" (second occurrence) should be --SINH--;

Signed and Sealed this

Twenty-fifth Day of December 1979

[SEAL]

Attest:

Attesting Officer

SIDNEY A. DIAMOND

Commissioner of Patents and Trademarks